United States Patent [19]

Ogino et al.

[11] Patent Number: 5,365,369
[45] Date of Patent: Nov. 15, 1994

[54] TWO DIMENSIONAL MOIRE REDUCTION TYPE PROJECTION DISPLAY

[75] Inventors: Masanori Ogino, Yokohama; Shoji Kuroda, Odawara; Yoshiaki Iwahara, Yokosuka, all of Japan

[73] Assignee: Hitachi, Ltd., Tokyo, Japan

[21] Appl. No.: 98,878

[22] Filed: Jul. 29, 1993

[30] Foreign Application Priority Data

Feb. 26, 1993 [JP] Japan .................................. 5-037822

[51] Int. Cl.$^5$ .............................................. G03B 21/60
[52] U.S. Cl. ...................................... 359/457; 359/460
[58] Field of Search ............... 359/453, 455, 456, 457, 359/460

[56] References Cited

U.S. PATENT DOCUMENTS

| Re. 33,795 | 1/1992 | Ogino | 353/74 |
|---|---|---|---|
| 4,432,010 | 2/1984 | Oguino | 358/60 |
| 4,531,812 | 7/1985 | Oguino | 350/128 |
| 4,725,134 | 2/1988 | Ogino | 353/74 |
| 4,919,518 | 4/1990 | Ogino et al. | 350/128 |
| 4,923,280 | 5/1990 | Clausen et al. | 350/128 |
| 4,961,642 | 10/1990 | Ogino | 353/38 |
| 5,066,099 | 11/1991 | Yoshida et al. | 359/457 |
| 5,076,661 | 12/1991 | Bradley | 359/456 |
| 5,206,761 | 4/1993 | Ogino | 359/457 |
| 5,289,311 | 2/1994 | McClelland et al. | 359/457 |
| 5,296,922 | 3/1994 | Mitani et al. | 348/779 |

Primary Examiner—Richard A. Wintercorn
Attorney, Agent, or Firm—Antonelli, Terry, Stout & Kraus

[57] ABSTRACT

A screen is constituted by one sheet of Fresnel lens and two sheets of lenticular lenses, and the following relationships are fulfilled: $0.9 \, T_o < v_y \cdot d_y / n$ and $0.9 \, T_o < v_x \cdot d_y < 3 \, T_o$ where $v_x$ and $v_y$ denote respectively angles, which are obtained when viewing a projection lens from the side of the lenticular lenses through the Fresnel sheet, $d_x$ and $d_y$ denote respectively distances between a surface of the Fresnel lens and focal planes of the lenticular lenses, $n$ denotes a refractive index of a medium, and $T_o$ denotes a pitch of the Fresnel lens, whereby radial two dimensional moiré disturbance appearing in a rear projection display can be reduced to one-fifth the amplitude of the prior art one.

4 Claims, 7 Drawing Sheets

TWO DIMENSIONAL MOIRE REDUCTION TYPE PROJECTION DISPLAY

BACKGROUND OF THE INVENTION

The present invention relates to a rear projection display and more particularly to a projection display which is capable of reducing radial two dimensional moiré disturbance appearing in a screen constituted by three sheets of members or more.

Most of the prior art rear projection displays employ a screen constituted by two sheets of members. Of the two sheets of members, one of them is a Fresnel lens and the other is a longitudinal stripe-like lenticular lens for emitting horizontally rays.

In order to emit rays vertically as well, a screen constituted by three sheets of members should be used. However, there arises a problem that if the number of members constituting the screen is increased, the reflection loss of light is correspondingly increased (first problem). In addition, there arises another problem that in that case, the complicated moiré disturbance will appear (second problem).

With respect to the first problem, i.e., the problem of the surface reflection loss, out of the above-mentioned problems, a measure of solving that first problem has followed the recent technical improvements. This measure is to apply an antireflection coating to a surface of the member constituting the screen. The application of the antireflection coating allows the matching with the refractive index of the member to be realized, and therefore, the reflection loss can be reduced.

However, of the above-mentioned problems, the second problem has been left unsettled. Further, the improvements in the recent computer technology have required a display which has the larger number of scanning lines. That is, in the present television broadcasts, as well known, the number of scanning lines per frame is about 500. However, along with the improvements in the computer technology, a display having the scanning lines of about 2,000 has been required. In order to realize such a display, it is necessary to use a screen having a picture element size, which is ¼ times in length and breadth as small as the conventional one.

In U.S. Pat. No. 4,725,134 to Masanori Ogino, there is described the principle of appearance of the moiré disturbance in a screen constituted by two sheets of members. More specifically, it is described that the moiré disturbance appears due to interference with a Fresnel lens having a concentric circle structure and it appears remarkably in the right and left ends of the screen. As apparent from the description in U.S. Pat. No. 4,725,134, the moiré disturbance becomes remarkable as the picture element size is smaller (in the case where a pitch of the Fresnel lens is fixed).

In U.S. Pat. No. 4,725,134, there is not described the principle of appearance of the radial moiré disturbance appearing in the diagonal corners peculiar to a three-sheets screen, and the means of coping therewith. Therefore, the present invention was made in order to complement U.S. Pat. No. 4,725,134.

U.S. Pat. No. 4,725,134 was given to Masanori Ogino as the applicant for letters patent on Feb. 16, 1988, and all disclosure of which patent is incorporated herein by the reference.

FIG. 1 shows one example of the prior art transmissive screen. For the sake of simplifying the analysis, first, it is assumed that a projection light source is a point source. In the figure, the reference numeral 1 designates a Fresnel sheet; the reference numeral 1' designates a Fresnel lens, which is provided on a light emitting surface of the Fresnel sheet 1; the reference numeral 2 designates a stripe-like lenticular sheet for vertical divergence; the reference numeral 2', a transverse stripe-like lenticular lens provided on a light incident surface of the lenticular sheet 2; the reference numeral 3, a lenticular sheet for horizontal divergence; the reference numeral 3', a lenticular lens provided on a light incident surface of the lenticular sheet 3; the reference numeral 3", a lenticular lens provided a light emitting surface of the lenticular sheet 3. In this connection, a pitch ($T_0$) of the Fresnel lens 1' is 0.1 mm, a pitch ($T_1$) of the lenticular lens 2' is in the range of 0.5 to 0.6 mm, a pitch of the lens 3' is in the range of 0.5 to 0.6 mm, and a pitch ($T_2$) of the lens 3" is in the range of 0.5 to 0.6 mm. Now, refer to U.S. Pat. No. 4,432,010 to Masanori Ogino for the details of a method of constructing the lenses 3' and 3". However, in U.S. Pat. No. 4,432,010, the moiré disturbance 6 and 7 as shown in FIG. 2 is not mentioned.

All disclosure of U.S. Pat. No. 4,432,010 to Masanori Ogino: Application No. 308,590, filed on Oct. 5, 1981 is incorporated herein by the reference.

As the coordinate system for representing systematically the whole moiré disturbance 5, 6 and 7, as shown in FIG. 2, both the rectangular coordinate system (x, y) and the polar coordinate system (R, $\theta$) are employed.

FIG. 3 shows a cross sectional view of the Fresnel lens and a point source 8. In the figure, rays applied from the point source 8 to a screen is converted into parallel emitted rays by the Fresnel lens 1'. In this connection, as indicated by hatched line parts in the figure, light-absence parts appear periodically on the side of a light emitting surface of the Fresnel lens 1'. That is, the Fresnel pitch period component appears unavoidably in the luminance distribution.

The luminance distribution of the rays emitted from the Fresnel lens is, when performing the Fourier analysis, expressed by the following expression.

$$\left. \begin{array}{l} T_0(R) \approx 1 + a_0 e^{j2\pi R/T_0} + a_0 e^{-j2\pi R/T_0} + \ldots \\ a_0 = \dfrac{\sin\pi(1-d)}{\pi(1-d)} \leq 0.5 \\ d = \text{duty factor} \\ T_o = \text{Fresnel pitch} \end{array} \right\} \quad (1)$$

where d denotes the duty factor in the hatched line parts, i.e., the light-absence parts of the exit surface of the Fresnel lens in FIG. 3. A value of d takes zero in the central part of the screen and about 0.4 in the peripheral part of the screen. Therefore, an amplitude $a_0$ of the fundamental wave component is zero in the central part of the screen and about 0.5 in the peripheral part of the screen.

Next, the function of the lenticular lens 2' will hereinbelow be described with reference to FIG. 4.

In general, the function of the lens is, when making parallel rays incident thereon, to convert the height coordinate of the incident light (position coordinate, i.e., y in FIG. 4; the origin thereof corresponds to the center of the surface of the lenticular lens 2' (or 14) as shown in FIG. 4) into the vertical direction $\theta$(y) of the emitted light. Then, a lenticular lens designated by the reference numeral 14 will be described later. Therefore, the lenticular lens serves to convert periodically the height coordinate of the incident light into the vertical coordinate of the emitted light. Thus, if an observer for observing the screen located in the distance observes the screen from a certain specific direction, the observer will observe light which is periodically sampled with respect to the height direction by the lenticular lens.

The sampling structure $T_1(y)$ thereof is expressed mathematically as follows.

$$T_1(y) = \sum_k e^{j2\pi Ky/T_1} \tag{2}$$
$$k = 0, \pm 1, \pm 2, \cdots$$
$$T_1 \equiv \text{lenticular pitch (2')}$$

In the same manner, the lenticular lens 3" in FIG. 1 serves to convert the transverse position coordinate of the incident light into the horizontal coordinate of the emitted light. Therefore, the sampling structure $T_2(x)$ thereof is expressed mathematically as follows.

$$T_2(x) = \sum_h e^{j2\pi hx/T_2} \tag{3}$$
$$h = 0, \pm 1, \pm 2, \cdots$$
$$T_2 \equiv \text{lenticular pitch (3")}$$

In the above expression, the origin of the x-axis corresponds to the center of the lenticular lens 3'.

Therefore, the pattern $T_{0,1,2}$ at which the observer looks on the screen surface is expressed quantitatively as follows.

$$T_{0,1,2} = T_0(R)T_1(y)T_2(x) \tag{4}$$

$$\approx (1 + a_1 e^{-j2\pi R/T_0} + a_1 e^{j2\pi R/T_0}) \times \sum_k e^{j2\pi ky/T_1} \sum_h e^{j2\pi hx/T_2}$$

$$\approx \sum_{k,h} e^{j2\pi(ky/T_1 + hx/T_2)} + a_1 \sum_{k,h} e^{j2\pi R(ky/RT_1 + hx/RT_2 - 1/T_0)} +$$

$$a_1 \sum_{k,h} e^{j2\pi R(ky/RT_1 + hx/RT_2 + 1/T_0)}$$

$$a_1 = a_0$$
$$k = 0, \pm 1, \pm 2, \cdots$$
$$h = 0, \pm 1, \pm 2 \cdots$$

In the above expression, the low spatial frequency components are easy to be remarkable, and thus they are referred to as "the moiré disturbance".

SUMMARY OF THE INVENTION

It is therefore an object of the present invention to provide a projection display in which two dimensional moiré is reduced by solving quantitatively the principle of appearance of the moiré disturbance appearing in the diagonal corners peculiar to the three-sheets screen.

It is another object of the present invention to provide a screen which is capable of being used in a high definition display having scanning lines of 2,000 or more.

It is still another object of the present invention to provide technology which is capable of reducing the moiré disturbance even in a screen in which an array pitch of a lenticular lens is 3 times or less as large as an array pitch of a Fresnel lens.

In order to attain the above-mentioned objects, in the present invention, the following means is employed.

In the fundamental embodiment of the present invention, in the case where it is assumed that an angle (rad), which is calculated when viewing the length of a pupil of a projection lens from the side of a lenticular lens through a Fresnel lens, is vy, and a distance between a light emitting surface of the Fresnel lens and a focal plane of a transverse stripe-like lenticular lens for vertical divergence, on which the group of focal points are located, corresponding to parallel rays on the light emitting side of the transverse stripe-like lenticular lens is dy, the quotient (vy·dy/n), which is obtained by dividing the product of vy and dy by a refractive index (n) of a medium, is set so as to be 0.9 times or more as large as the array pitch of the Fresnel lens.

In addition, in the case where it is assumed that an angle (rad), which is calculated when viewing the width of the pupil of the projection lens from the side of the lenticular lens through the Fresnel lens, is vx, and a distance between the light emitting surface of the Fresnel lens and a focal plane of a longitudinal stripe-like lenticular lens for horizontal divergence, on which the group of focal points are located, corresponding to parallel rays on the light emitting side of the longitudinal stripe-like lenticular lens is dx, the quotient (vx·dy/n), which is obtained by dividing the product of vx and dy by the refractive index (n) of the medium, is selected so as to be 0.9 times or more and 3 times or less as large as the array pitch of the Fresnel lens.

In the fundamental embodiment of the present invention, in accordance with the condition of the above product of vy and dy, the moiré disturbance appearing in the top and bottom ends of the screen is reduced.

In accordance with the condition of the above product of vx and dx, the moiré disturbance appearing in the right and left ends of the screen is reduced, and the excessive focus degradation is prevented.

Further, in accordance with the condition of the above product of vx and dy and the above product of vx and dx, the moiré disturbance appearing in the diagonal corners and the like of the screen is reduced.

DESCRIPTION OF THE PREFERRED EMBODIMENTS

Figure 5:
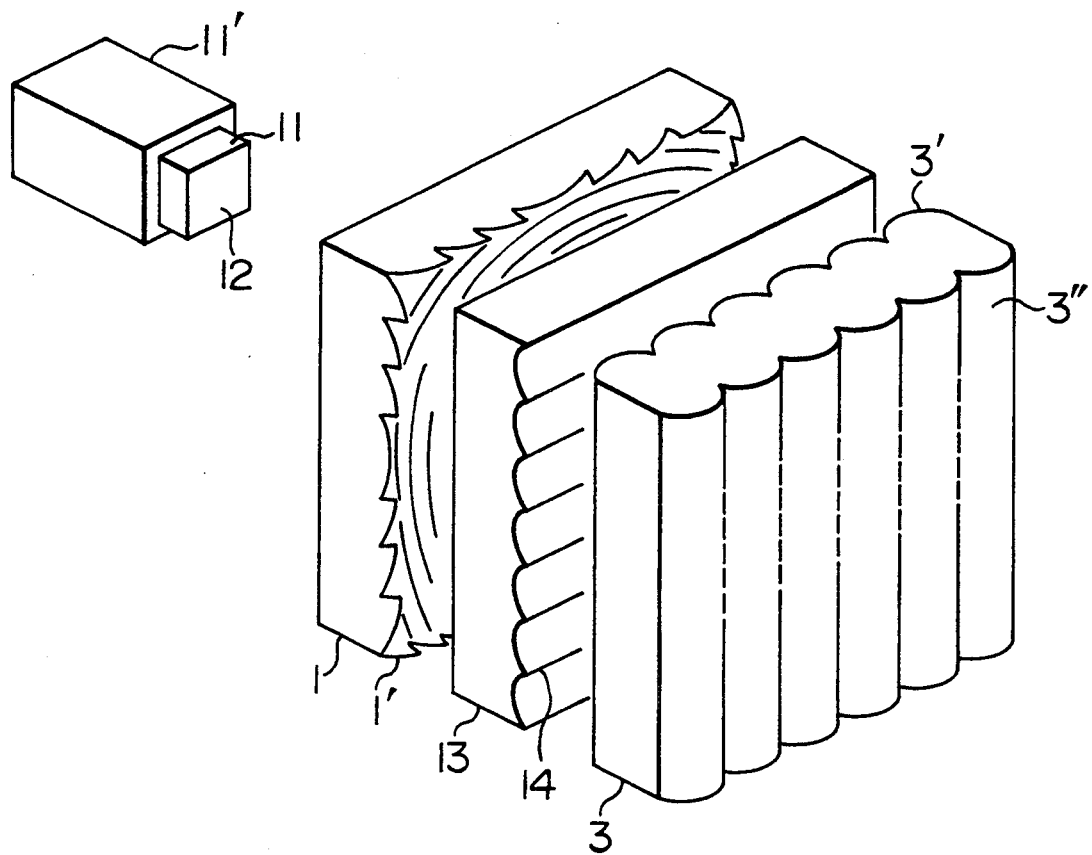
FIG. 5 is a perspective view of a screen showing a configuration of the fundamental embodiment of the present invention.

The fundamental embodiment of the present invention is shown in FIG. 5. In the figure, the reference numeral 11' designates a projector; the reference numeral 11 designates a projection lens; the reference numeral 12 designates a pupil of the projection lens; the reference numeral 1 designates a Fresnel sheet; the reference numeral 3, a longitudinal stripe-like lenticular sheet; the reference numeral 13, a transverse stripe-like lenticular sheet; and the reference numeral 14, a transverse stripe-like lenticular lens.

Figure 6:
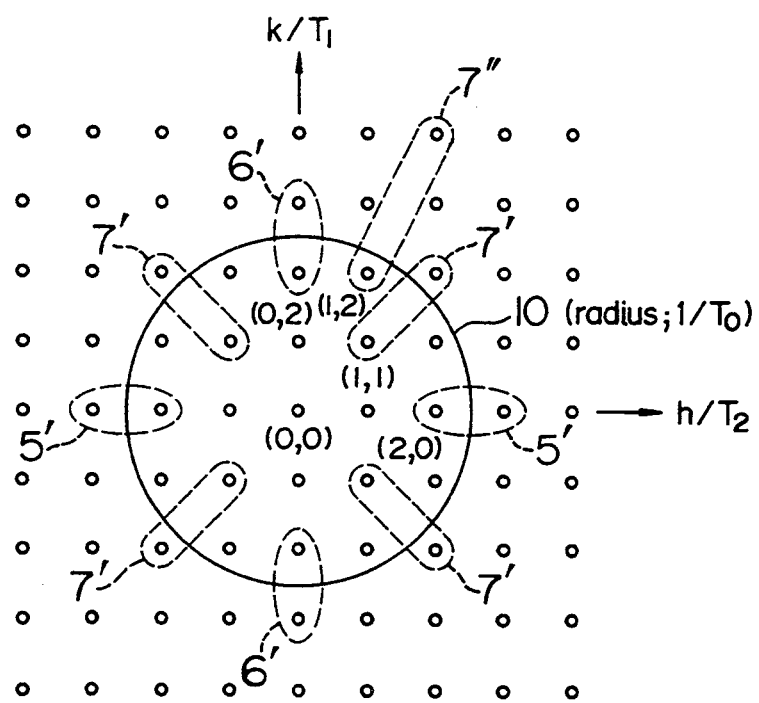
FIG. 6 is a two dimensional spectrum diagram showing frequency conditions for reducing the moiré disturbance.

The frequency condition for reducing the moiré disturbance is shown in the two dimensional frequency spectrum plane of FIG. 6. In FIG. 6, the axis of abscissa represents the spatial frequency of the longitudinal stripe structure. The axis of ordinate represents the spatial frequency of the transverse stripe structure. The lattice points represented by respective small circles in the figure are spectra which are obtained by multiplying the above T1(y) by the above T2(x). That is, these lattice points correspond to a first term of the right member of the expression 4. the locus 10 represented by a large circle in the figure is a spectrum of the Fresnel fundamental wave component of To(R) and its radius is 1/To. A distance between the large circle 10 and each of the adjacent lattice points represents the spatial frequency of each of the radial moiré disturbance.

Figure 1:
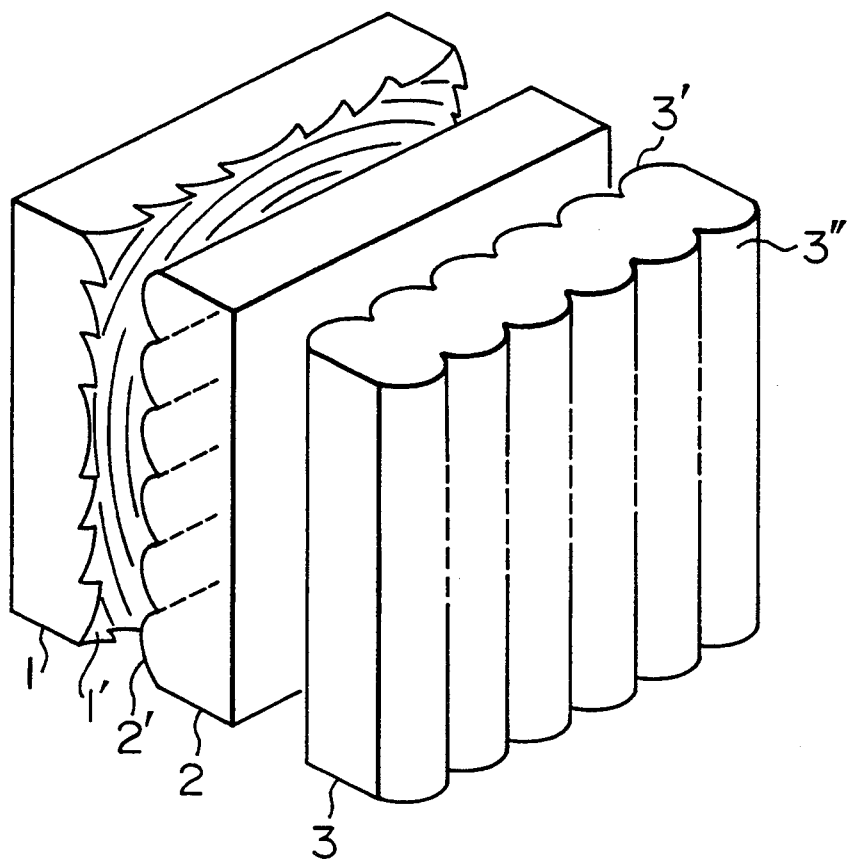
FIG. 1 is a perspective view showing a structure of the prior art transmissive screen.
Figure 2:
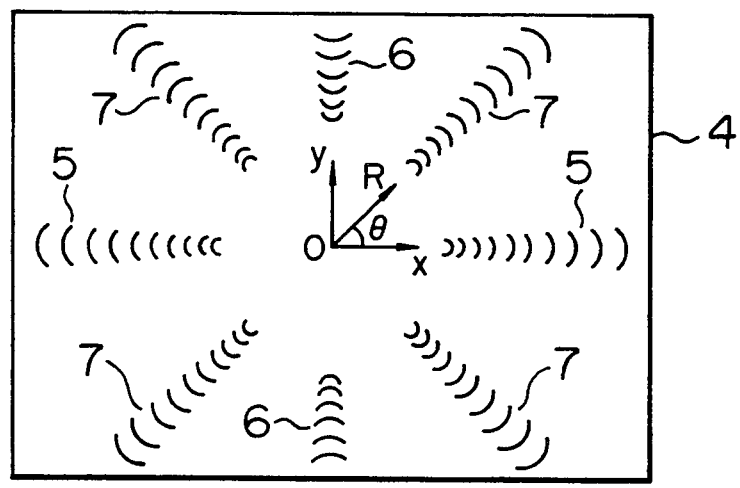
FIG. 2 is a diagram showing a moiré pattern and the coordinate system of the prior art screen.

The moiré disturbance due to the spectra surrounded by dotted lines 5', 6' and 7' in FIG. 6 corresponds approximately to the moiré disturbance designated by the reference numerals 5, 6 and 7 in FIG. 2. Still, te illustration of the moiré disturbance corresponding to the moiré disturbance due to the spectra surrounded by a dotted line 7'' is omitted in FIG. 2 for the sake of simplicity. The spatial frequency $f_M$ in a direction of the radius R of each radial moiré appears in the value in ( ) of the exponential function of a second term of the right member of the expression 4. The following expression is obtained by transforming the expression in ( ) thereinto (rectangular coordinates→polar coordinates).

$$f_M = ky/RT_1 + hx/RT_2 - 1/T_o \qquad (5)$$
$$= \sqrt{(k/T_1)^2 + (h/T_2)^2} - 1/T_o$$

Figure 7A:
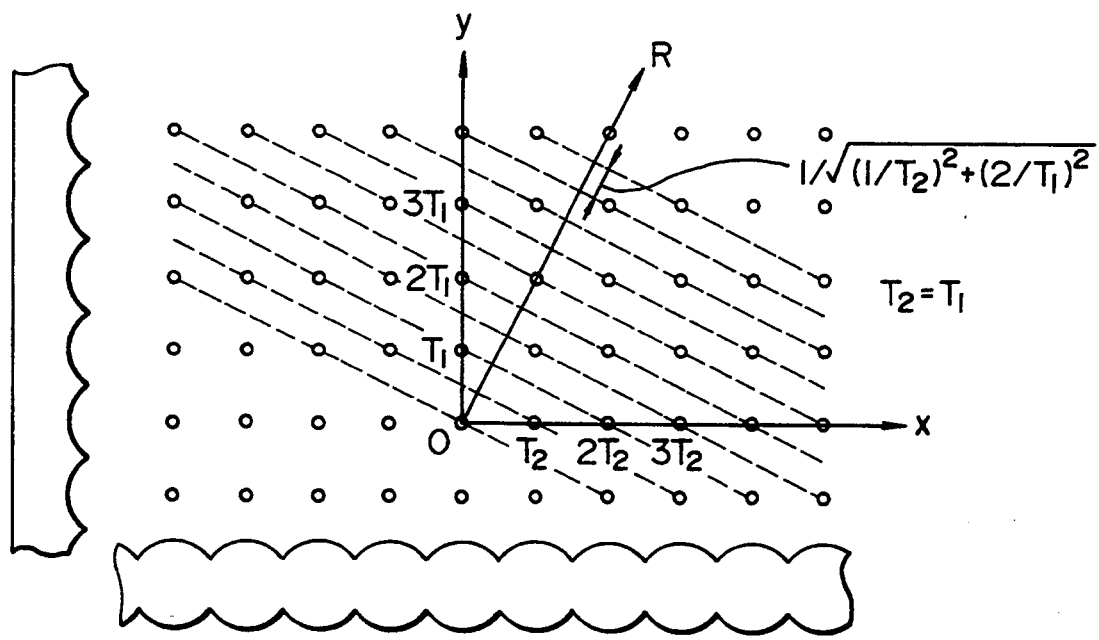
FIGS. 7A and 7B are respectively diagrams each showing oblique spectra on the real plane.

For example, the moiré, in the top right, due to the spectra surrounded by the dotted line 7' in FIG. 6 corresponds to the two dimensional lenticular structure of (h, k)=(1, 2). The period structure, on the real two dimensional plane, i.e., on the screen surface, corresponding to that two dimensional lenticular structure is shown in FIG. 7A. In the figure, the axis of abscissa is the x-axis and the axis of ordinate is the y-axis. The period of the two dimensional lenticular in the direction of the radius R is, as shown in the figure, equal to the following expression.

$$1/\sqrt{(1/T_2)^2 + (2/T_1)^2} \qquad (6)$$

It should be noted that the period of the two dimensional lenticular differs quite from the following apparent pseudo lenticular period.

$$\sqrt{(2T_1)^2 + (T_2)^2} \qquad (7)$$

Figure 7B:
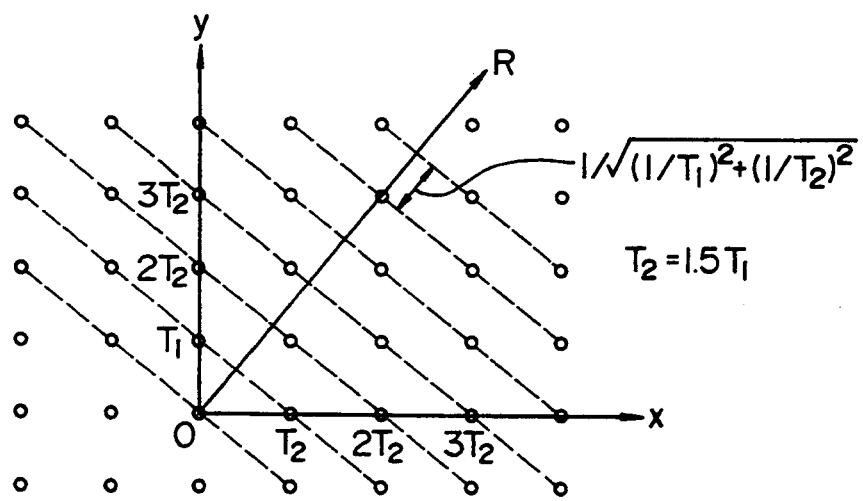

In order to assist the understanding of this notice, another example is shown in FIG. 7B. In FIG. 7A and FIG. 6 corresponding thereto, there was shown the specific case where $T_2$ is accidentally equal to $T_1$.

Another case where $T_2$ is equal to 1.5 $T_1$ is shown in FIG. 7B. The direction of the radius R in the figure is a direction corresponding to the relationship of (h, k)=(1, 1). It can be proved that on the radial slits, the lenticular intersection on the real two dimensional plane is not present except for the origin.

That is, the radial direction of the moiré is not present in the direction of connecting the intersections of the lenticular lenses perpendicularly intersecting each other.

The radial direction of the moiré coincides with the direction perpendicular to the dotted lines connecting the intersections of the lenticular lenses perpendicularly intersecting each other.

It is believed that from the foregoing, the physics governing the radial direction of the moiré disturbance is properly understood.

In general, in order to make the moiré disturbance inconspicuous, it is necessary to prevent the disturbance frequency from becoming zero beat. For this purpose, it is required that in the two dimensional spectrum diagram of FIG. 6, each of the two dimensional lenticular lattice spectra (indicated by the small circles) does not overlap with the circle 10 of the Fresnel fundamental wave spectrum. That is, the frequency $f_M$ of the moiré spectrum is expressed by the following expression.

$$f_M = \{\sqrt{(kT_o/T_1)^2 + (hT_o/T_2)^2} - 1\}\frac{1}{T_o} \neq 0 \qquad (8)$$
$$k = 0, \pm 1, \pm 2, -$$
$$h = 0, \pm 1, \pm 2, -$$

When performing the design, in order to select To in such a way that in accordance with the expression 8, a minimum value of an absolute value of the moiré spectrum frequency $f_M$ becomes large as much as possible with $T_1$ and $T_2$ as the given conditions, in FIG. 6, the large circle may be drawn by setting suitably its radius (1/To) so that the large circle is away from each lattice point as much as possible. Therefore, according to the principle thus found out, it is made unnecessary that the expensive actual object is repeatedly manufactured by way of experiment.

The consideration about the frequency condition for reducing the moiré disturbance has been completed. Next, the amplitude condition will hereinbelow be considered in detail.

The expression 4 is, as described above, based on the assumption that the projection light source is the point source, and thus, the moiré amplitude $a_o$ in the expression 4 is equal to the above $a_o$ in the expression 1, i.e., about 0.5 which is relatively large. Therefore, the frequency component corresponding to the moiré amplitude $a_o$ is easy to be remarkable as the moiré disturbance.

In the following analysis, the concepts of angle conversion size of the projection light source and focal planes in the lenticular lens are introduced into the analysis, and then the measure against reduction of the amplitude of the moiré disturbance is quantitated.

Figure 8:
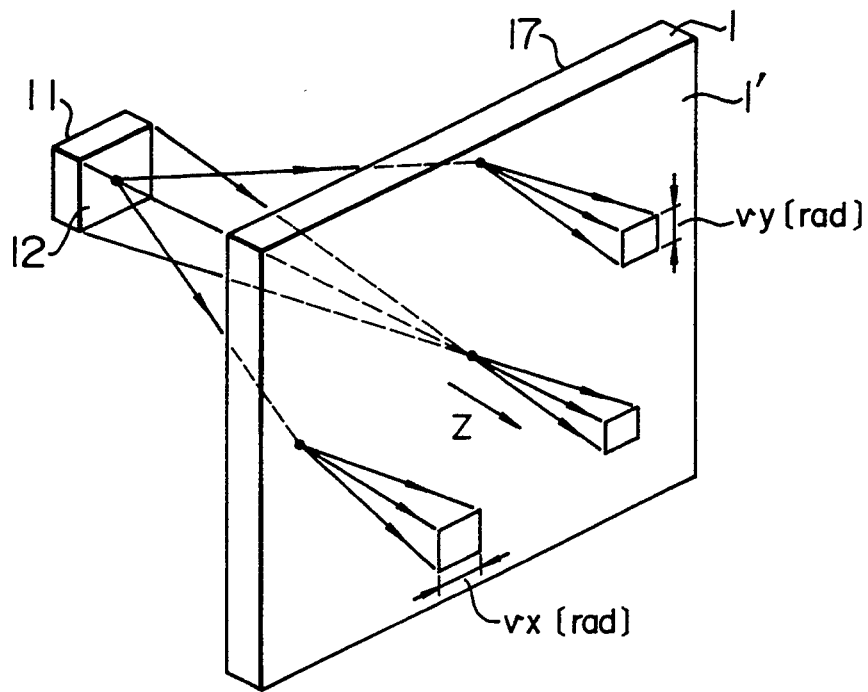
FIG. 8 is a perspective view showing the concept of an angle which is obtained when viewing a pupil of a projection lens from the side of a lenticular lens.

FIG. 8 is a perspective view showing the concept of angle conversion size of the projection light source. In the figure, the reference numeral 11 designates a projection lens of a projector, and the reference numeral 12 designates a pupil of the projection lens. In the figure, for the sake of simplifying the analysis, the shape of the pupil is set to a rectangular shape. The generalization to the normal circular pupil will be described later specially.

In the figure, the reference numeral 1 designates a Fresnel sheet, and the reference numeral 1' designates a Fresnel lens.

It is shown in the figure that the emitted rays through the Fresnel lens is propagated microscopically in a direction of the tangent to the screen, but has microscopically the divergence of (vx, vy). The values of (vx, vy) corresponds to an angle of the pupil which is obtained when an observer, who is located on the side of the lenticular lenses, views the pupil of the projection lens through the Fresnel lens. In addition, the values of (vx, vy) are approximately equal to values, which are respectively obtained by dividing the width and length of the pupil of the projection lens by a distance between the lens and the screen, in a normal case.

Figure 10:
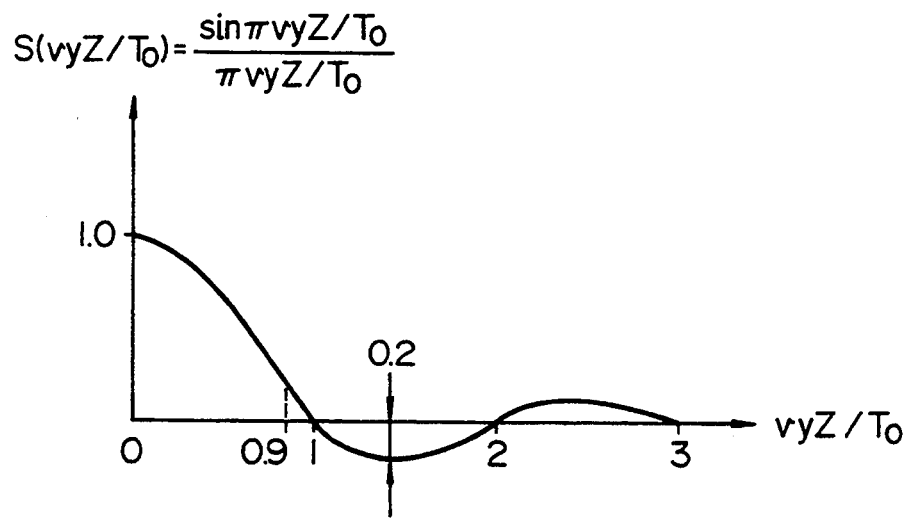
FIG. 10 is a graphical representation showing a hold spectrum of the Fourier function.

Now, next, in the case where a thin ideal diffusing plate is arranged at the distance Z from the position of the surface of the Fresnel lens, the Fresnel structure $T_o(R, \theta, Z)$, which is projected on the diffusing plate, is expressed by the following expression.

$$T_o(R, \theta, Z) \approx 1 + a_o S\left(\frac{v_x 2\cos\theta}{T_o}\right) S\left(\frac{v_y 2\sin\theta}{T_o}\right) \times \{e^{j2\pi R/T_0} + e^{-j2\pi R/T_0}\} \quad (9)$$

$$a_o \leq 0.5, \; T_o = \text{Fresnel pitch}$$

$$S(x) = \frac{\sin\pi x}{\pi x}$$

where S(x) denotes the Fourier uniform rectangular spectrum and is as shown in FIG. 10 (in the case of $\theta = 90°$). As apparent from FIG. 10, the Fresnel structure disappears at the distance Z, where the relationship of vy/To=1 is established, from the Fresnel lens. Therefore, if the group of focal points, i.e., the focal plane of the transverse stripe-like lenticular lens is arranged at that distance from the Fresnel lens, the moiré disturbance appearing in the top and bottom ends of the screen is cancelled.

Likewise, if the group of focal points, i.e., the focal plane of the longitudinal stripe-like lenticular lens is arranged at the distance Z, where the relationship of vx/To is established, from the Fresnel lens, the moiré disturbance appearing in the right and left ends of the screen is cancelled.

The expression 8 is established in the case where after the rays have been emitted from the Fresnel lens, they are propagated through the air. Since actually, the rays are propagated through the medium made of plastic constituting the screen, vx and vy in the expression 9 need to be divided by the refractive index n (1.5 to 1.6) of the medium.

Further, in the case where it is assumed that the distances in the medium between the surface of the Fresnel lens and the focal planes of the lenticular lenses are dx and dy, respectively, if the pattern $T_{0,1,2}$ on the screen is obtained, the moiré amplitude coefficient $a_1$ in the expression 4 is transformed into the following expression.

$$a_1 = a_o S\left(\frac{v_x d_x \cos\theta}{nT_o}\right) S\left(\frac{v_y d_y \sin\theta}{nT_o}\right) \quad (10)$$

$$a_o \leq 0.5, \; S(x) = \frac{\sin\pi x}{\pi x}$$

where $\theta$ denotes one component of the polar coordinates on the screen shown in FIG. 2 and represents the direction of radiation of the moiré.

In order to attain the above-mentioned objects of the present invention, it is necessary to make the absolute value of the value of the moiré amplitude coefficient in the expression 10 smaller than or equal to 0.1 regardless of the direction, i.e., the value of $\theta$.

The condition therefor is expressed by the following expression.

$$\frac{v_x d_x}{n} \geq 0.9 T_o, \; \frac{v_y d_y}{n} \geq 0.9 T_o \quad (11)$$

On the other hand, if in the above expression 11, the distance dx is made too large, a side effect in which the focus is degraded is generated. In order to suppress this side effect within the limits of measurement, it is necessary to make the right member of the expression 11 smaller than 3 To (3 times as large as the pitch of the Fresnel lens). Therefore, the following expression is obtained.

$$\frac{v_x d_x}{n} = 0.9 T_o \sim 3 T_o \quad (12)$$

$$\frac{v_y d_y}{n} \geq 0.9 T_o$$

The above-mentioned analysis was carried out in the case where the pupil 12 of the projection lens of FIG. 8 has the rectangular shape.

In the case where the pupil of the lens has a circular shape, the analysis is performed in the following manner.

It is assumed that an angle of the pupil which is obtained when viewing the pupil of the Fresnel lens from the light emitting side of the Fresnel lens is $v$ (radian). Then, an image of the pupil diverges circularly as light is propagated.

The Fourier spectrum of the circular image having the isopycnic distribution is given by the primary Bessel function $J_1$. Therefore, the moiré amplitude coefficient $a_1$ corresponding to the expression 10 is expressed by the following expression.

$$a_1 \approx a_o \left\{ B\left(\frac{vd_x}{nT_o}\right) \right\}^{cos2\theta} \cdot \left\{ B\left(\frac{vd_y}{nT_o}\right) \right\}^{sin2\theta} \quad (13)$$

$$a_o \leq 0.5,$$

$$B(x) \equiv \frac{J_1(\pi x)}{0.5\pi x}$$

In the above expression 13, if the condition of making the absolute value of $a_1$ smaller than or equal to 0.1 regardless of the direction, i.e., the value of $\theta$ is obtained, 0.9 To in each right member of the expression 12 is replaced with To. There is small difference therebetween. Therefore, the expression 12 may be regarded as the fundamental necessary condition for constructing the present invention.

The consideration of the amplitude condition for reducing the moiré disturbance has been completed. By the above-mentioned consideration, all the frequency condition and the amplitude condition for reducing the moiré disturbance due to the interference between the two dimensional lenticular lens and the concentric Fresnel lens have been explicated.

Figure 9:
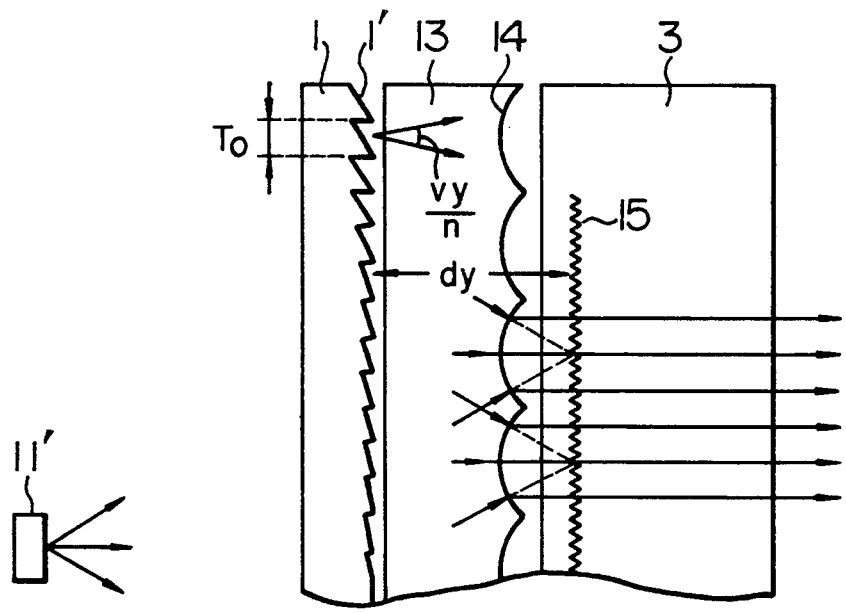
FIG. 9 is a longitudinal sectional view of the screen shown in FIG. 5.

FIG. 9 shows a vertical sectional view of the fundamental embodiment shown in FIG. 5. As shown in the upper part of the figure, the rays emitted from the Fresnel lens are propagated through the medium while diverging at an angle of vy/n in the medium. The plane on which the group of focal points corresponding to the parallel rays emitted from the lenticular lens 14 are positioned, i.e., the focal plane is indicated by a broken line 15. A distance between the surface of the Fresnel lens 1' and the focal plane 15 in the lenticular lens 3 is dy. A pitch of the Fresnel lens is To. These parameters vy/n, dy and To fulfill the above-mentioned expression 12, whereby the moiré disturbance appearing in the top and bottom ends of the screen is cancelled.

Figure 11:
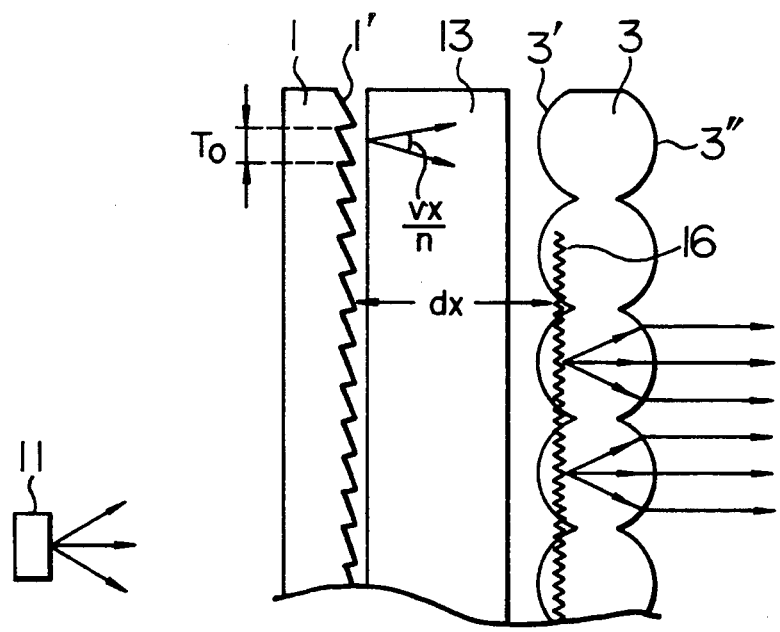
FIG. 11 is a horizontal sectional view of the screen shown in FIG. 5.

FIG. 11 shows a horizontal sectional view of the fundamental embodiment shown in FIG. 5. As shown in the upper part of the figure, the rays emitted from the Fresnel lens are propagated through the medium while diverging at an angle of vx/n in the medium. The focal plane corresponding to the parallel rays emitted from the lenticular lens 3" is indicated by a broken line 16 in the figure. A distance between the surface of the Fresnel lens 1' and the focal plane 16 in the lenticular lens is dx. A pitch of the Fresnel lens is To. These parameters vx/n, dx and To fulfill the above-mentioned expression 12, whereby the moiré disturbance appearing in the right and left ends of the screen is cancelled.

The conditions in the expression 11 are fulfilled at the same time, whereby the oblique radial moiré disturbance in an arbitrary direction is cancelled or reduced.

Figure 3:
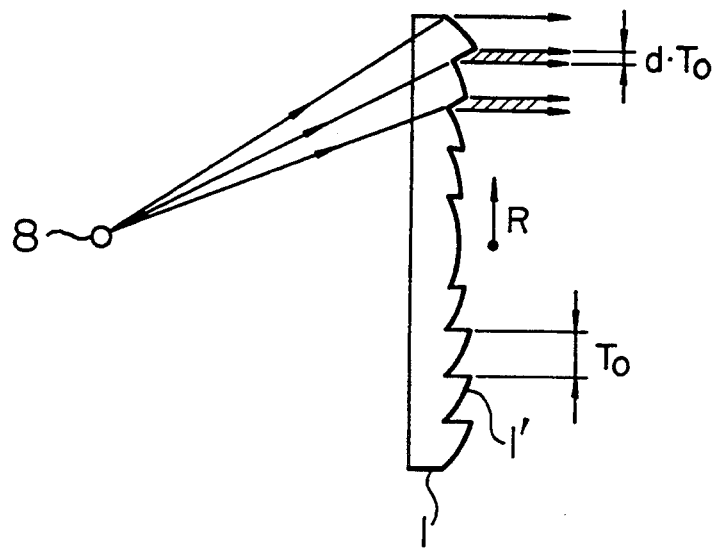
FIG. 3 is a longitudinal sectional view of a Fresnel lens useful in explaining the prior art moiré disturbance.
Figure 4:
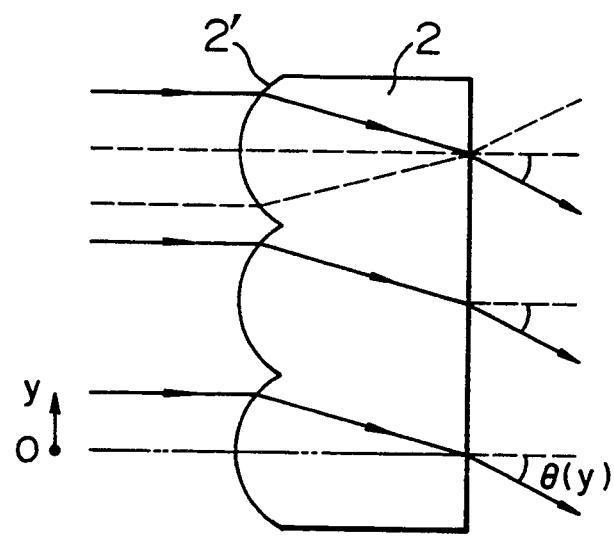
FIG. 4 is a longitudinal sectional view of a lenticular lens useful in explaining the prior art moiré disturbance.

That is, the display of the present embodiment is designed in such a way that the rays emitted from the light-absence parts of the exit surface of the Fresnel lens, which are indicated by the hatched lines in FIG. 3, diverges on the surface of the focal plane 16 of the lens 3" by the Fresnel pitch To. Therefore, it is possible to cancel the moiré disturbance. In this case, the rays may diverge by the Fresnel pitch To, but even in the case where the rays diverge by integral multiple of To, the same effects are obtained.

The concrete numerical example corresponding to the fundamental embodiment of FIG. 5 is shown in the following Table 1.

TABLE 1

| | [mm] | | |
|---|---|---|---|
| | Thickness | Pitch | Radius of curvature |
| Example 1 | | | |
| Fresnel | 0.3 | 0.1 | — |
| Transverse stripe lenticular | 3 | 0.25 | 0.36 |
| Longitudinal stripe lenticular | 0.28 | 0.25 | 0.09 |
| TYPE | vx/n, vy/n = 0.08 | | |
| | SIZE: 0.8 m × 0.6 m | | |
| Example 2 | | | |
| Fresnel | 0.3 | 0.112 | — |
| Transverse stripe lenticular | 3 | 0.5 | 0.7 |
| Longitudinal stripe lenticular | 0.55 | 0.5 | 0.18 |
| TYPE | vx/n, vy/n = 0.05 | | |
| | SIZE: 1.4 m × 1.05 m | | |

Each of the examples 1 and 2 is an example in which the number of stripes in the whole screen is larger than or equal to 2,000.

The description of the fundamental embodiment of the present invention has been completed.

Next, the description will hereinbelow be given with respect to variations of the present invention.

In FIG. 5, the reason for employing a concave lens-like configuration for the transverse stripe-like lenticular lens 14 is that the concave lens-like configuration is effective in order to increase the distance dy in FIG. 9. Alternatively, a convex lens configuration may be employed for the lenticular lens 14.

In this case, however, in FIG. 9, the distance dy becomes smaller than a thickness of the lenticular lens sheet 13. Therefore, in order to fulfill the expression 11, it is necessary to use a lenticular lens having a smaller pitch, or increase a thickness of the lenticular lens sheet 13. The profile of the lenticular lens 14 does not need to have a cylindrical configuration having a fixed radius of curvature, and thus the radius of curvature can be changed cyclically.

Figure 12:
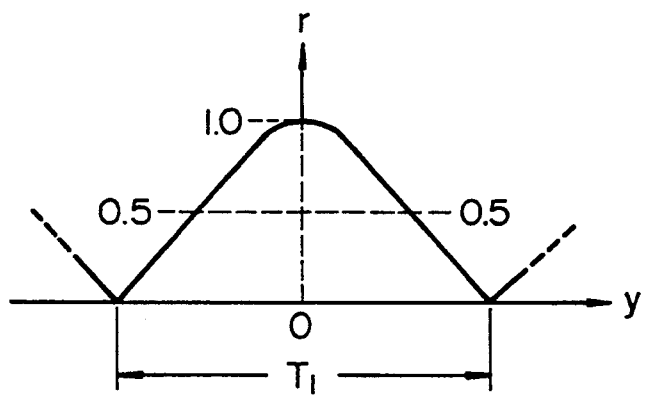
FIG. 12 is a graphical representation showing distribution of radii of curvature of a lens 13 shown in FIG. 5.

FIG. 12 shows an example of distribution of the radii of curvature of the lenticular lens which is practically recommended.

In the figure, the axis of abscissa represents the vertical coordinate y on the screen surface and the axis of ordinate represents a radius of curvature r of the lenticular lens 14. As shown in the figure, the radius of curvature of the peripheral part of each lenticular lens is made relatively 0.5 times or less as small as that of the control part of each lenticular lens, whereby the vertical directional characteristics similar thereto can be obtained. That is, the directional characteristics can be obtained in which when viewing the screen from the front, the screen appears to be the brightest, and when viewing the screen from the upper/lower side, the screen appears naturally to be dark.

In FIG. 5, a black stripe may be added to the light emitting surface of the longitudinal stripe-like lenticular lens sheet 3. Refer to U.S. Pat. No. 4,432,010 for the details.

In Table 1, the reason of setting a thickness of the Fresnel sheet to a small value of 0.3 mm is that the ghost disturbance due to the reflected stray light in the light incident surface of the Fresnel sheet is made inconspicuous.

If the Fresnel sheet is thinned, in the case of the prior art two-sheets screen (in FIG. 5, the sheet 13 is removed), it is difficult to make the screen member stand up per se. In other words, the screen member is bent by its dead weight.

In the present structure, however, since a thickness of the member 13 is set to a large value of about 3 mm (refer to Table 1), this member can be made to stand up per se by being inserted into the screen frame. Therefore, when mounting the screen of the present invention to the associated member or members, the screen can be constructed in such a way that the member 13 is made to stand up per se, and the remaining members 1 and 3 are suspended from the screen frame or the top part of the member 13.

Figure 13:
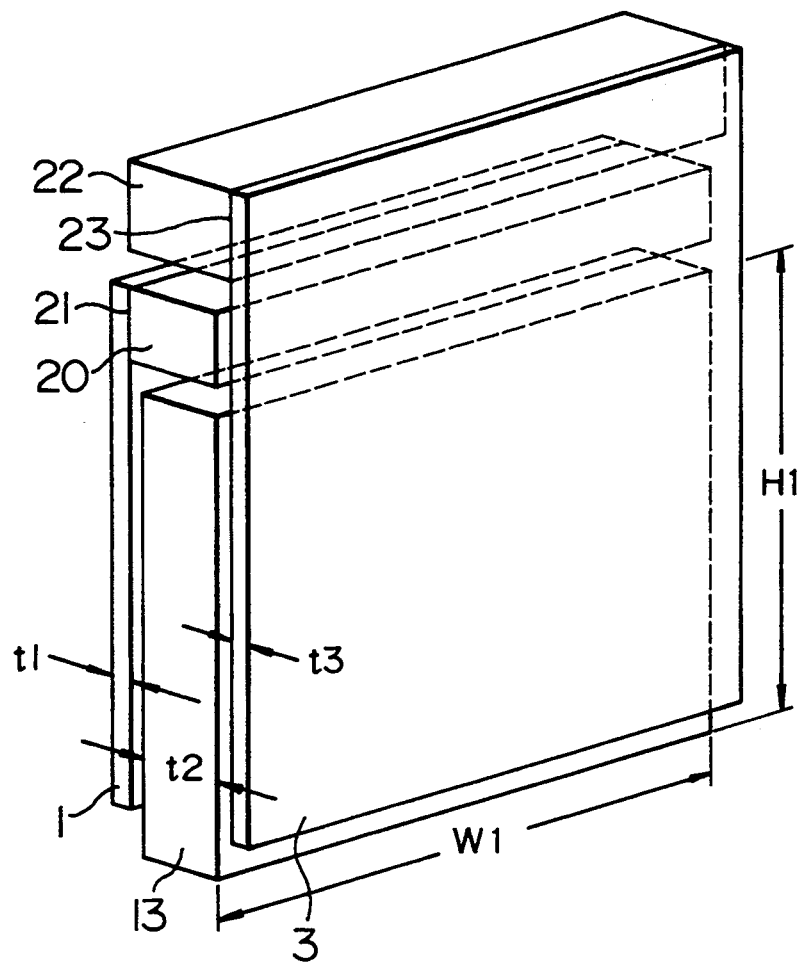
FIG. 13 is a perspective view showing a gravity supporting structure.

FIG. 13 shows a perspective view of such a supporting structure. In the figure, the elements designated by the reference numerals 1, 13 and 3, respectively, are the same as those of the fundamental embodiment of the present invention, and their size is the same as that of the example 1 of Table 1. The reference numerals 20 and 22 designate respectively square poles each having a cross-section area of 3 mm and the reference numerals 21 and 23 designate respectively bonding surfaces. t1, t2 and t3 are respectively 0.3 mm, 3 mm and 0.28 mm, and W1 and H1 are respectively 0.8 m and 0.6 m.

Incidentally, the present invention has been described in detail on the assumption that the present invention is applicable to a CRT projection display. However, it is, of course, to be understood that the present invention is also applicable to a liquid crystal projection display. In the liquid crystal projection display, the values of vx and vy in FIG. 8 are normally very small. In such a case, in order to establish the expression 9 of the present invention, it is effective that the lenticular lens component is included in the surface of the Fresnel lens $1'$ formed on the light emitting surface of the Fresnel sheet 1 thereby to increase effectively the values of vx and vy.

With respect to the concept of the angles vx and vy which are obtained when viewing the pupil of the projection lens used in the present invention, the values thereof in the central part of the screen may be different from those in the peripheral part of the screen in some cases. As for the rigorous definition in such cases, vx is defined as the value in the right and left ends of the screen, and vy is defined as the value in the top and bottom ends of the screen because the former is connected with the moiré disturbance in the right and left ends of the screen and the latter is connected with the moiré disturbance in the top and bottom ends of the screen.

By the present invention, the principle of appearance of the moiré disturbance in the screen constituted by the three sheets of members, which has not heretofore been made clear, is herein made clear quantitatively.

According to the fundamental embodiment of the present invention, without use of an optical diffusion loss element, all the radial moiré disturbance including the moiré disturbance appearing in the diagonal corners can be effectively reduced to 1/5 times or less that of the prior art, and the amplitude coefficient of the moiré disturbance can be suppressed to 0.1 or less. In addition, the fundamental embodiment of the present invention can contribute to the construction of the rear projection display of high definition in which the number of picture elements is 2,000×2,000 or more in length and breadth. Further, with respect to the vertical directional characteristics, the desirable characteristics can be obtained in which when viewing the screen from the front, the screen appears to be bright and when viewing the screen from the upper/lower side, the screen appears normally to be dark.

What is claimed is:

1. A two dimensional moiré reduction type rear projection display comprising: a transmissive screen including at least a sheet having a surface of a concentric Fresnel lens in a light emitting surface thereof, a sheet having a surface of a transverse stripe lenticular lens and a sheet having a surface of a longitudinal stripe lenticular lens; and a projection lens, characterized in that said at least three sheets are arranged in that order from a light incident side to a light emitting side, and the following relationships are obtained:

$0.9\,To < vy \cdot dy/n$, and $0.9\,To < vx \cdot dx/n < 3\,To$ where vy and vx denote a longitudinal divergence angle and a transverse divergence angle, respectively, which are obtained when viewing a pupil of said projection lens from the side of said lenticular lenses through the surface of said Fresnel lens, dy denotes a distance between the surface of said Fresnel lens and a focal plane of said transverse stripe lenticular lens sheet corresponding to parallel emitted rays, dx denotes a distance between the surface of said Fresnel lens and a focal plane of said longitudinal stripe lenticular lens sheet corresponding to parallel emitted rays, n denotes a refractive index of a medium of the member constituting said transmissive screen, and To denotes an array pitch of the surface of said Fresnel lens.

2. A projection display according to claim 1, wherein with respect to distribution of radii of curvature of said transverse stripe lenticular lens, a value of a radius of curvature in each peripheral part is relatively 0.5 times or less as small as that of each central part.

3. A projection display according to claim 1, wherein the array pitch of said Fresnel lens is set in such a way that lattice array spectra, which are formed by combination of said transmissive stripe lenticular lens sheet and said longitudinal stripe lenticular lens sheet, and a circular Fresnel spectrum, which has an inverse number of the pitch of the surface of said Fresnel lens as its radius, do not intersect each other on a two dimensional spatial frequency plane, whereby the sum of the square of arbitrary integral multiple of a ratio of the pitch of said Fresnel lens and the pitch of said transverse stripe lenticular lens to the square of arbitrary integral multiple of a ratio of the pitch of said Fresnel lens to the pitch of said longitudinal stripe lenticular lens is not equal to 1.

4. A projection display according to claim 1, further comprising means for suspending both said Fresnel lens and said longitudinal stripe lenticular sheet from the top end of said transverse stripe lenticular sheet.

* * * * *